US 6,302,946 B1

(12) United States Patent
Cronia et al.

(10) Patent No.: US 6,302,946 B1
(45) Date of Patent: Oct. 16, 2001

(54) DEODORIZING AIR FILTER AND METHOD OF FABRICATING SAME

(75) Inventors: Forrest E. Cronia, Florence, SC (US); Kenneth Dale Montgomery, Garner, NC (US)

(73) Assignee: Flanders Corporation, Washington, NC (US)

( * ) Notice: Subject to any disclaimer, the term of this patent is extended or adjusted under 35 U.S.C. 154(b) by 0 days.

(21) Appl. No.: 09/617,615

(22) Filed: Jul. 17, 2000

Related U.S. Application Data

(62) Division of application No. 09/135,265, filed on Aug. 17, 1998, now Pat. No. 6,099,901.

(51) Int. Cl.$^7$ .................................................. B01D 53/02
(52) U.S. Cl. ........................... 96/154; 55/524; 55/DIG. 5
(58) Field of Search ................................ 95/285; 96/153, 96/154, 222; 55/524, DIG. 5, 527, 528, 521, 522

(56) References Cited

U.S. PATENT DOCUMENTS

| 3,015,367 | * | 1/1962 | Smith et al. | 55/524 |
|---|---|---|---|---|
| 3,019,127 | * | 1/1962 | Czerwonka et al. | 96/153 |
| 3,502,537 | * | 3/1970 | Pearson et al. | 55/524 |
| 3,857,732 | | 12/1974 | Yoshino . | |
| 3,870,495 | * | 3/1975 | Dixson et al. | 55/524 |
| 4,081,501 | | 3/1978 | Muther . | |
| 4,160,059 | * | 7/1979 | Samejima | 55/524 |
| 4,227,904 | * | 10/1980 | Kasmark, Jr. et al. | 55/524 |
| 4,429,001 | * | 1/1984 | Kolpin et al. | 96/153 |
| 4,504,290 | * | 3/1985 | Pontius | 55/524 |
| 4,510,193 | * | 4/1985 | Blucher et al. | 96/154 |
| 5,221,573 | * | 6/1993 | Baigas, Jr. | 55/524 |
| 5,254,386 | | 10/1993 | Simpson et al. . | |
| 5,328,758 | * | 7/1994 | Markell et al. | 96/154 |
| 5,338,340 | | 8/1994 | Kasmark, Jr. et al. . | |
| 5,350,443 | * | 9/1994 | Von Blucher et al. | 96/154 |
| 5,395,428 | * | 3/1995 | Von Blucher et al. | 96/154 |
| 5,486,410 | * | 1/1996 | Groeger et al. | 96/154 |
| 5,571,604 | * | 11/1996 | Sprang et al. | 55/524 |
| 5,662,728 | * | 9/1997 | Groeger | 55/524 |
| 5,783,080 | | 7/1998 | Hsieh . | |
| 5,807,424 | * | 9/1998 | De Ruiter et al. | 96/153 |
| 5,942,323 | * | 8/1999 | England | 55/524 |
| 6,024,782 | * | 2/2000 | Freund et al. | 96/154 |
| 6,099,901 | * | 8/2000 | Cronia et al. | 55/524 |

* cited by examiner

Primary Examiner—Duane S. Smith
(74) Attorney, Agent, or Firm—Alston & Bird LLP

(57) ABSTRACT

A deodorizing air filter media which is composed of a web of non-woven fibers having myriad discrete particles of a deodorizing component, such as sodium bicarbonate, uniformly dispersed throughout the thickness of the web. The media is fabricated by a two step process, wherein a non-woven web is passed through a first aqueous solution including a binder, and then dried to cured the binder and anchor the crossing points of the fibers in the web. Next, the dried web is passed through a second aqueous solution having a binder in a reduced concentration, together with a particulate deodorizing component suspended therein. The web is then again dried to cure the newly added binder and anchor the particulate deodorizing component to the fibers.

14 Claims, 3 Drawing Sheets

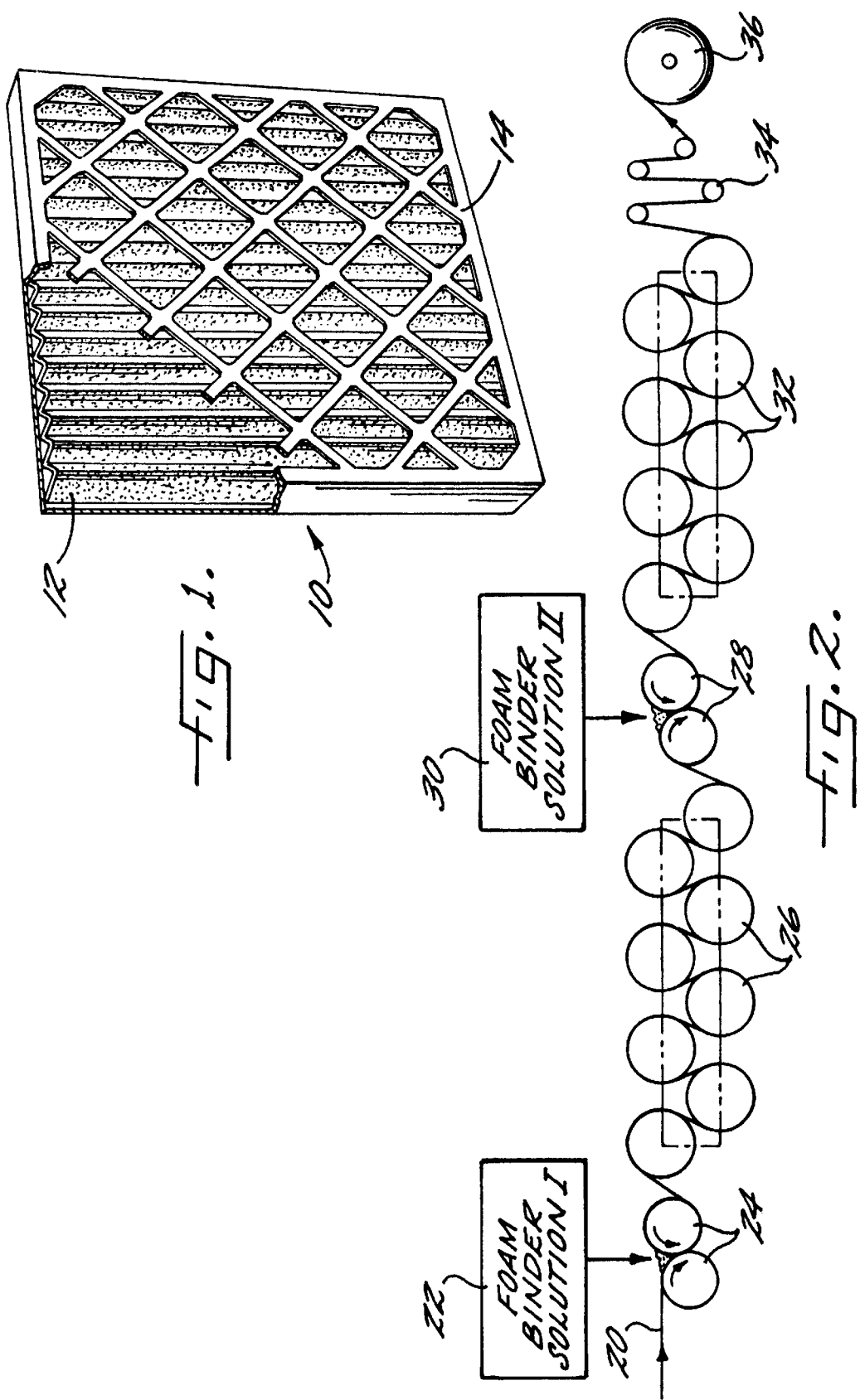

DEODORIZING AIR FILTER AND METHOD OF FABRICATING SAME

CROSS REFERENCE TO RELATED APPLICATION

The present application is a division of Application Serial No. 09/135,265, filed Aug. 17, 1998, now U.S. Pat. No. 6,099,901.

BACKGROUND OF THE INVENTION

The present invention relates to an air filter for residential or industrial use, which has the ability to substantially reduce odors in the airstream passing therethrough.

Air filters for residential or industrial use are commonly fabricated by forming a filtering media which is composed of a non-woven web of randomly arranged fibers which are held together at their crossing points by a cured latex or other suitable binder which is applied to the web by spraying, bath, roller, etc. The binder may also incorporate a coloring agent, a fire retardant, and other components, as may be desired.

It has previously been proposed to apply carbon (or charcoal) particles to the filtering media for the purpose of adding an odor removing capability to the media. In one such process, carbon particles are sprinkled onto the media which has been coated with a tacky adhesive, so that the particles are anchored to the fibers of the media when the adhesive dries. While such carbon impregnated filters are reasonably effective in removing odors from gases having an inorganic source, such as gasoline or toluene, they are not particularly effective in removing odors from gases having an organic source, such as cooking or other household odors.

Sodium bicarbonate is recognized for its ability to remove odors from gases having an organic source, but prior attempts to add sodium bicarbonate to an air filtering media have not been totally satisfactory. For example, in one previously proposed process, powdered sodium bicarbonate is first suspended in an aqueous solution which includes a suitable binder, and the solution is then sprayed onto the surface of the previously formed filter media. However, as far as the applicants are aware, this proposal has not been commercially successful since the odor removing component is deposited only on the surface of the non-woven web, and its ability to effectively remove odors is thus diminished. The spraying process also is inefficient, since the powdered sodium bicarbonate remains is suspension and does not dissolve, and it tends to rapidly clog the nozzles.

As opposed to spraying a solution containing sodium bicarbonate onto the surface of the filter media, it has also been proposed to add the sodium bicarbonate to the binder which is applied to the web as part of the initial fabrication of the media. However, this proposal has also proven to be unworkable, since the sodium bicarbonate is alkaline and it changes the pH of the binder solution toward the base side. Apparently, the resulting raising of the pH in turn significantly limits the ability of the binder to cure and set up, and the resulting media does not possess sufficient integrity to serve its intended function.

It is accordingly an object of the present invention to provide a method of fabricating a filtering media composed of a web of non-woven fibers, which is able to effectively remove household and other odors from the airstream passing therethrough.

It is a more particular object of the invention to provide a method of the described type and wherein the ability of the binder to cure and set up, and thereby anchor the crossing points of the fibers, is not diminished by the addition of an alkaline odor removing component such as sodium bicarbonate, to the binder.

It is still another object of the invention to provide an air filtering media composed of a web of non-woven fibers, which has discrete particles of an alkaline odor removing component dispersed through the entire thickness of the web, so as to permit a highly effective removal of odors passing through the media.

SUMMARY OF THE INVENTION

The above and other objects and advantages of the present invention are achieved by the discovery that when the deodorizing component, and particularly a particulate sodium bicarbonate, is added to an aqueous solution containing a conventional binder, such as a vinyl acrylic copolymer, in a relatively low solids concentration, the binder is not degraded by the raising of the pH and it is able to effectively cure and anchor the sodium bicarbonate particles to the fibers of the web. This finding permits the solution to be added to the media by a post treatment process as described herein. The post treatment process of the invention also achieves a complete dispersal of the deodorizing component throughout the thickness of the web.

More particularly, the method of the present invention includes the steps of forming an air permeable web of randomly arranged fibers, and then saturating the web with a first aqueous solution which includes a binder in a relatively high solids concentration. The web is then dried so as to at least substantially cure the binder and anchor the crossing points of the fibers in the web.

The dried web, which is substantially self-sustaining, is then saturated with a second aqueous solution which includes a binder in a relatively low solids concentration, together with a particulate deodorizing compound, such as sodium bicarbonate, suspended therein in an amount which is sufficient to impart odor removing properties in the completed air filter media. The web is then again dried to at least substantially cure the binder added with the second solution to thereby anchor the particulate deodorizing component to the fibers of the web.

The process as described above can be conducted as a batch process, wherein the web resulting from the initial saturation and drying steps is wound into a roll for shipment or storage, and then later unwound to conduct the second saturation and drying steps. The process can also be conducted continuously, wherein the web advances to the second saturation step immediately after the first drying step.

Preferably, each of the saturating steps includes passing the web through the nip of a pair of rollers, so as to force the solution into the interior of the web from both sides. Complete dispersal of the particles of the deodorizing component throughout the thickness of the web can thereby be achieved.

It is also preferred to add a foaming agent to each of the solutions, and foaming the solution prior to application of the solution to the web.

BRIEF DESCRIPTION OF THE DRAWINGS

FIG. 1 is a perspective view of an air filter for residential or industrial use, of a type adapted to incorporate the features of the present invention;

FIG. 2 is a schematic diagram of a process for fabricating the media of a filter of the type shown in FIG. 1, and which embodies the present invention;

DETAILED DESCRIPTION OF THE INVENTION

Figure 3A:
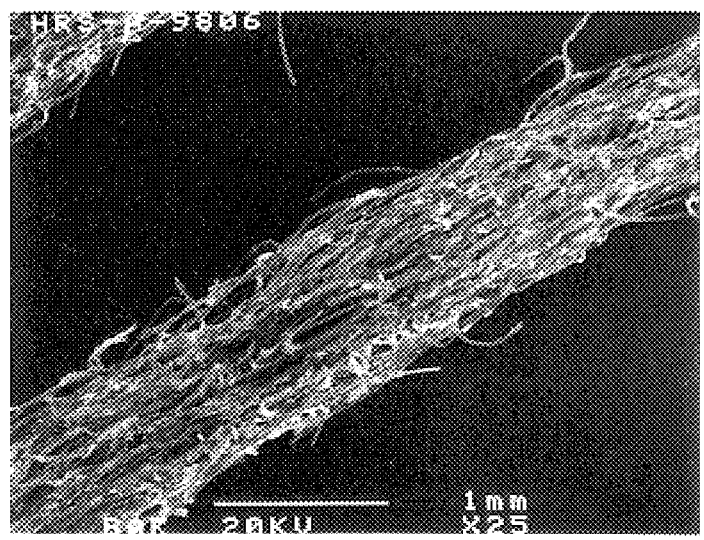
FIGS. 3A–3B are SEM photographs of an untreated filter media of conventional construction, taken on cross sections of the media at 25× and 60× respectively.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring more particularly to the drawings, FIG. 1 illustrates an air filter 10 which embodies the features of the present invention. The filter comprises a media 12 which is composed of a non-woven web which typically comprises a blend of synthetic and natural fibers so as to provide high dust holding capacity and high efficiency. As a particular example, the web has a thickness of about 0.08 inches, and it is composed of about 80–85% polyester fibers and 15–20% cotton fibers, at a density of about 3.7 oz/yd$^2$. The web is folded in accordion fashion to form a plurality of V-shaped pleats, and it is housed in a rectangular, paperboard frame 14, in the conventional manner.

The media 12 has a binder applied to the fibers thereof so as to anchor their crossing points and thereby provide a necessary integrity to the web, and in accordance with the present invention, the binder also serves to anchor myriad discrete particles of a deodorizing component, such as sodium bicarbonate or potassium bicarbonate, which are substantially uniformly dispersed throughout the thickness of the web. The particulate deodorizing component preferably has a density of at least about 2 gm/ft$^2$.

The method by which the above-described filter media is fabricated is illustrated schematically in FIG. 2. As there illustrated, a non-woven web 20 of randomly arranged fibers is initially formed by a conventional carding process and so as to have a thickness of about 1 inch. Also, a first aqueous binder solution 22 is prepared which includes a binder in a relatively high predetermined solids concentration. The binder may, for example, comprise polyvinyl acetate, ethylene vinyl chloride, or vinyl acrylic copolymer, and it is present in a concentration of at least about 19% solids, and preferably between about 19% to 30% solids.

The first aqueous binder solution 22 may include other ingredients as known in the art, such as a colorant, a flame retardant, a surfactant, and a foaming agent. Preferably, a foaming agent is employed, and the solution is agitated so as to produce a foamed solution having a blow ratio of about 10 to 1.

The foamed binder solution 22 is laid upon the nip of a pair of rotating rollers 24, which form a first solution applying station, and the web 20 is fed through the foamed solution and the nip. The spacing of the nip is adjustable so as to be less than the thickness of the web, thereby causing the air bubbles of the foamed solution to collapse, and the solution to be forced from both sides into the interior of the web and thereby completely penetrate the web.

From the initial solution application, the web 20 is fed directly to a series of drying cans 26, which are designed to apply heat to both sides of the advancing web. The temperature of the cans is graduated, with the initial cans having a temperature of about 250° F. and the terminal cans having a temperature of about 325–350° F. The binder is thus dried and cured, so as to anchor the crossing points of the fibers and provide significant integrity to the web.

To this point, the above described process corresponds to a process currently being used to fabricate conventional air filters. However, in accordance with the present invention, the web is subjected to a post treatment process which serves to anchor the particles of the deodorizing component uniformly throughout the thickness of the web. This post treatment process may be conducted as a batch process, wherein the web delivered from the drying cans is wound into a supply roll, which is later further processed. Preferably, and as illustrated in FIG. 2, a continuous process is employed, wherein the web is delivered immediately to a second solution applying station.

The second solution applying station includes a nip formed by a pair of rolls 28, and a second binder solution 30 is deposited on the nip. The second binder solution 30 has a particulate deodorizing component suspended therein in an amount which is sufficient to impart odor removing properties in the completed air filter media. The particulate deodorizing component preferably comprises powdered sodium bicarbonate or potassium bicarbonate, which have known odor removing properties. The particles may be within the range of about 200 to 325 U.S. mesh size, preferably about 325 U.S. mesh size. In this regard, a density of sodium bicarbonate particles to provide at least about 2 gm/ft$^2$ has been found effective in effectively removing most household odors from an airstream passing through the filter.

The binder of the second solution is preferably of the same chemical composition as the binder of the first solution, so as to promote bonding between the two. Also, a binder is selected which is capable of maintaining a uniform dispersion when a substantial amount (e.g. up to about 90% solids content) of an alkaline deodorizing component is added thereto. In the case of most known binders, the second solution should have a significantly lower solids concentration than the binder of the first solution, so as to avoid the deleterious effects of the increased pH and achieve this desired result. The concentration of the binder in the second solution to achieve this result is typically within the range of about 7% to 9% solids.

The second binder solution 30 preferably also includes a foaming agent, and has been agitated so as to foam the solution. The foamed solution is laid upon the nip of the second pair of rotating rolls 28, and the web is fed through the second foamed solution and then the nip, which again has a spacing less than the thickness of the web so as to force the second solution from both sides through the complete thickness of the web. The deodorizing particles, which are suspended in the second solution, are thereby substantially uniformly dispersed throughout the thickness of the web.

From the second pair of nip rollers, the web is fed across a second series of drying cans 32, which are graduated in temperature from about 250° F. in the initial cans to about 325–350° F. in the final cans. This final heating stage serves to dry and cure the binder applied with the second solution and thereby causes the particles of the deodorizing component to be anchored to the fibers of the web. The web then passes through a conventional accumulator 34, and is then wound into a roll 36.

As discussed above, the relatively low solids concentration of the binder in the second solution 30 has been found to avoid the deleterious interference with the curing of the binder caused by the high pH of the solution resulting from the presence of the alkaline deodorizing component. Also, the low solids concentration of the binder in the second solution is believed to avoid the total encapsulation of the particles, which could adversely effect their ability to remove odors.

The resulting web may then be pleated and fabricated into a completed filter by conventional techniques.

EXAMPLE I

The following example will further illustrate a specific embodiment of the invention.

| Formulation - Initial Solution | |
| --- | --- |
| Water | 100 gallons |
| Binder | 455 dry pounds–110 gallons (6499) |
| Fire Retardant (AR 371) | 50 dry pounds |
| Fire Retardant (AR 295) | 150 dry pounds |
| Foaming Agent (PE 90) | 1 gallon |
| Water | 100 gallons |
| Total Wet Weight | 3447 pounds |
| Total Dry weight | 655 pounds |
| % Solids | 19% |
| Formulation - Second Solution | |
| Water | 154 gallons |
| Binder | 40 dry pounds–10 gallons (6499) |
| Foaming Agent (PE 90) | 1 gallon |
| Fine Particulate Sodium Bicarbonate | 400 pounds |
| Total Wet Weight | 1772 pounds |
| Total Dry Weight | 440 pounds |
| % Solids | 24.8% |
| Sodium Bicarbonate Add-on Calculations | |
| Untreated Web Basis Weight | 2.9 oz/yd$^2$ |
| Treated Web Basis Weight | 3.6 oz/yd$^2$ |
| Sodium Bicarbonate-Binder Add-on | 0.7 oz/yd$^2$ |
| % Sodium Bicarbonate (400/440) | 90.7% |
| Sodium Bicarbonate Add-on | 0.63 oz/yd$^2$ (2 gm/ft$^2$) |

An air permeable web of randomly arranged fibers was produced in a conventional manner, the web being composed of a blend of about 85% polyester fibers and the remainder cotton fibers. The web had a thickness of about 1 inch, and a density of 2.3 oz./yd$^2$.

The binder of the first solution comprised cross linking vinyl acrylic copolymer supplied by National Starch and Chemical Company of Bridgewater, New Jersey as product No. X-Link 78-6499. The fire retardant comprised inorganic and organic phosphates supplied by Spartan Flame Retardants of Crystal Lake, Illinois as product Nos. AR 371 and AR 295), and the foaming agent comprised POE (9.2) Nonylphenol Hyonic supplied by Henkel Corporation of Ambler, PA as product No. PE-90.

The sodium bicarbonate of the second solution was supplied by Church & Dwight Co., as their grade 3, which is the finest particle size made by that company on a regular production basis and has an average U.S. mesh size of about 325.

The initial solution was prepared at room temperature by preparing a first solution containing the fire retardant and foaming agent and 100 gallons of water. This first solution was then mixed with a second solution containing the binder solution and another 100 gallons of water. The resulting solution was then foamed by agitation to a blow ratio of about 10 to 1, and the resulting foamed solution was laid upon the nip of a pair of rotating rollers, which were spaced at the nip a distance of about 0.03 inches. The web was passed through the foam layer and the nip, causing the air bubbles to collapse and the solution to be forced from both sides through the full thickness of the web. The web was then passed over a series of drying cans, which were graduated in temperature from about 250° F. to 325–350° F.

The drying cans caused the binder to cure and anchor the crossing points of the web, and thereby provide substantial integrity to the web. The web at this point in the process had a density of about 2.9 oz/yd$^2$.

After the initial drying step, the web was continuously advanced into the second solution, which had been foamed by agitation, and then deposited upon the nip of the second pair of rotating rollers. The rollers were spaced at the nip a distance of about 0.03 inches, and the solution was similarly forced from both sides through the thickness of the web, so as to substantially uniformly disperse the deodorizing particles throughout the thickness of the web. The web was then advanced along the drying cans, which were graduated in temperature from about 250° F. to 325–350° F. The resulting web had a density of about 3.6 oz/yd$^2$, thus indicating that the add-on from the deodorizing particles and binder of the second solution was about 0.7 oz/yd$^2$.

Figure 3B:
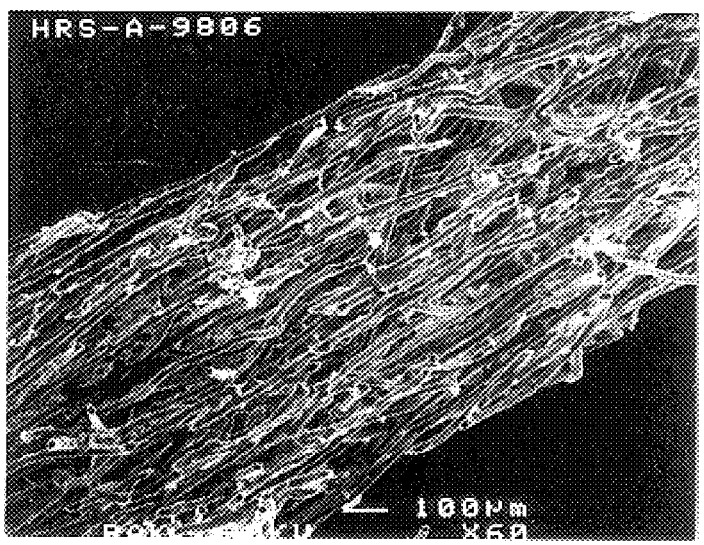
Figure 3C:
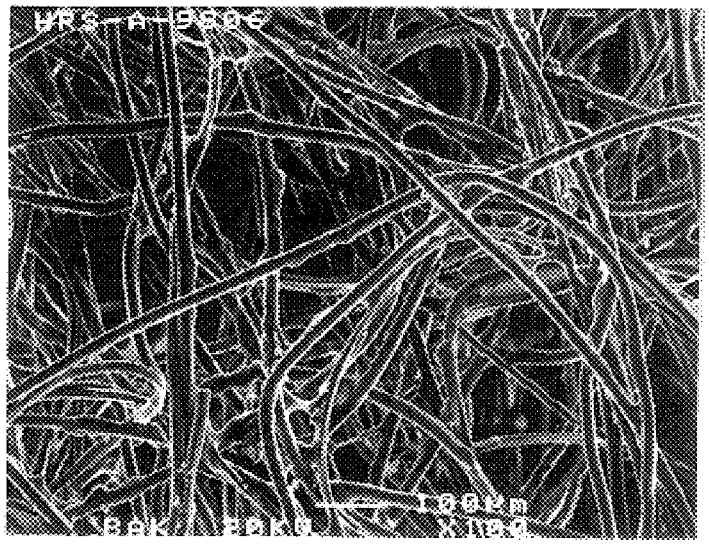
FIG. 3C is a SEM photograph of the surface of the same media shown in FIGS. 3A and 3B, taken at 100×.
Figure 4A:
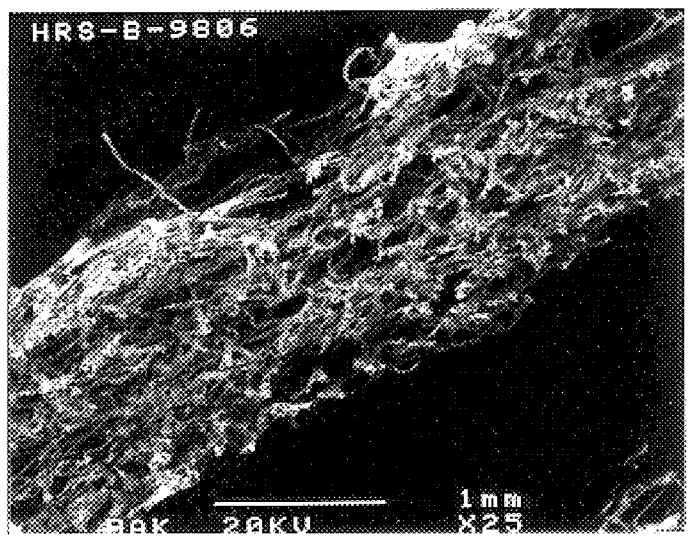
FIGS. 4A–4C correspond to FIGS. 3A–3C respectively, but show a media which has been fabricated with a post treatment of sodium bicarbonate in accordance with the present invention.
Figure 4B:
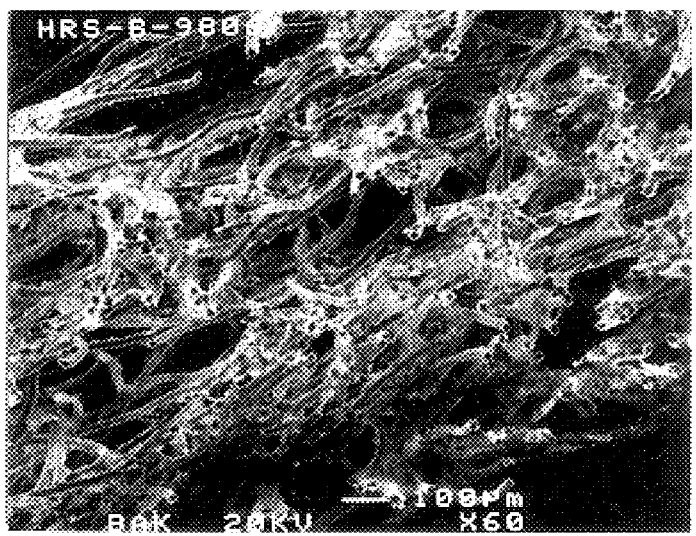
Figure 4C:
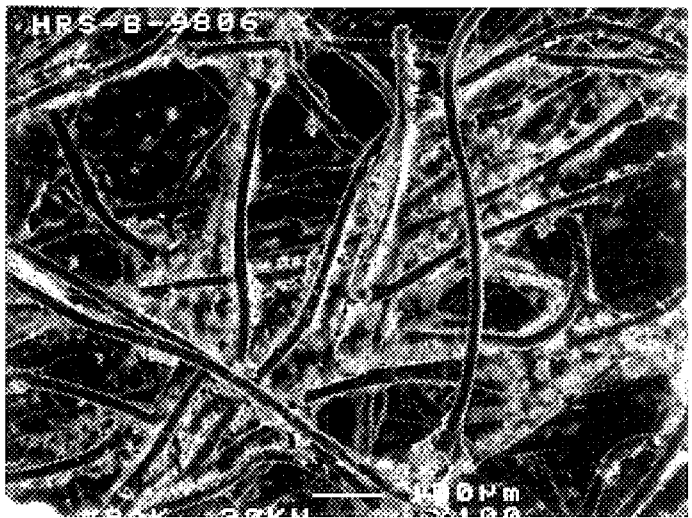

The photomicrographs of FIGS. 3A–3C and 4A–4C compare untreated media, i.e. media which has been subjected only to the initial binder solution, with media which has been subjected to the post treatment process of the present invention and as described above in Example I. The photomicrographs of FIGS. 4A–4C clearly reveal that the particles of sodium bicarbonate are uniformly distributed throughout the thickness of the web.

Many modifications and other embodiments of the invention will come to mind to one skilled in the art to which this invention pertains having the benefit of the teachings presented in the foregoing descriptions and the associated drawings. For example, it will be understood that various other components, such as antimicrobial agents or colorants, may be added to the impregnating resin composition. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A filter media capable of removing odors from an airstream passing therethrough, comprising
    an air permeable web of randomly arranged fibers,
    a binder applied to the fibers so as to anchor their crossing points, and
    myriad discrete particles of an alkaline deodorizing component anchored to the fibers, with the particles being substantially uniformly dispersed
    throughout the thickness of the web.

2. The filter media as defined in claim 1 wherein the web has a density of about 3.7 oz./yd$^2$ and a thickness of at least about 0.08 inches.

3. The filter media as defined in claim 2 wherein the density of the particles is at least about 2 gm/square foot.

4. The filter media as defined in claim 1 wherein the alkaline deodorizing component is selected from the group consisting of sodium bicarbonate and potassium bicarbonate.

5. The filter media as defined in claim 1 wherein the binder is selected from the group consisting of polyvinyl acetate, ethylene vinyl chloride, and vinyl acrylic copolymer, and wherein the binder serves to anchor the particles to the fibers of the web.

6. A filter media capable of removing odors from an airstream passing therethrough, comprising an air permeable web consisting of randomly arranged fibers, a first binder component applied to the fibers so as to anchor their crossing points, and myriad discrete particles of an alkaline deodorizing compound anchored to the fibers by means of a second binder component which is applied over the first binder component, with the particles being substantially uniformly dispersed throughout the thickness of the web.

7. The filter media as defined in claim 6 wherein each of the first and second binder components is applied in foamed acquous solution by passing the web through the nip of a pair of rollers so as to force the solution from both sides and through the thickness of the web, and then drying the web.

8. The filter media as defined in claim 7 wherein the alkaline deodorizing compound is selected from the group consisting of sodium bicarbonate and potassium bicarbonate.

9. The filter media as defined in claim 8 wherein the first and second binder components are chemically the same.

10. The filter media as defined in claim 1 wherein the web is characterized by the absence of an interlaced fabric attached thereto.

11. The filter media as defined in claim 10 wherein the web is folded in accordion fashion to form a plurality of V-shaped pleats.

12. The filter media as defined in claim 11 wherein the web is housed in a paperboard frame.

13. The filter media as defined in claim 6 wherein the web is folded in accordion fashion to form a plurality of V-shaped pleats.

14. The filter media as defined in claim 13 wherein the web is housed in a paperboard frame.

* * * * *